E. M. SLOCUM.
PROCESS FOR TREATING LATEX AND PRODUCT THEREOF.
APPLICATION FILED FEB. 27, 1917.
1,306,838.
Patented June 17, 1919.
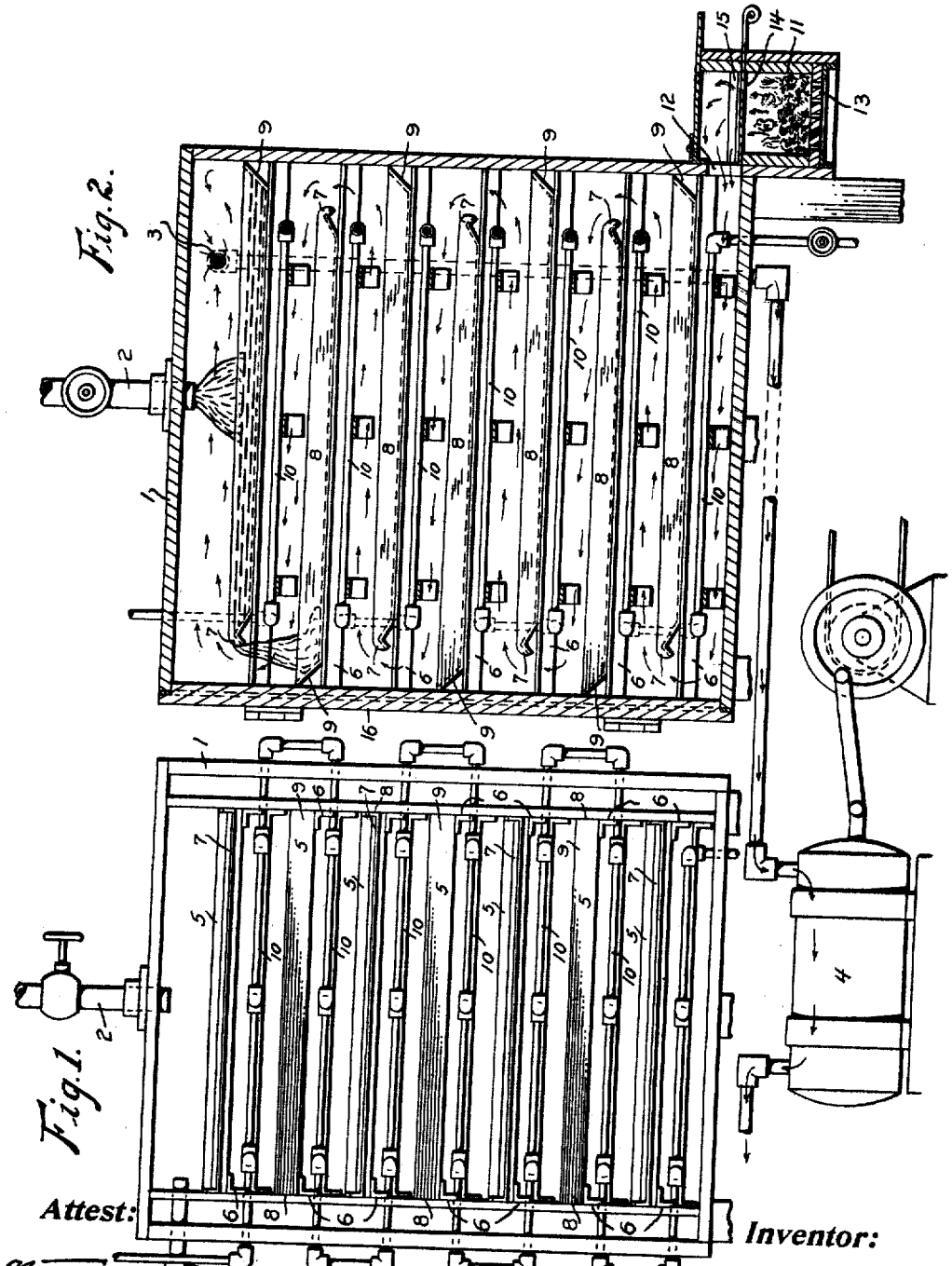

UNITED STATES PATENT OFFICE.

EDWARD MARK SLOCUM, OF MEDAN, SUMATRA, DUTCH EAST INDIES, ASSIGNOR TO GENERAL RUBBER COMPANY, A CORPORATION OF NEW JERSEY.

PROCESS FOR TREATING LATEX AND PRODUCT THEREOF.

1,306,838. Specification of Letters Patent. Patented June 17, 1919.

Application filed February 27, 1917. Serial No. 151,163.

*To all whom it may concern:*

Be it known that I, EDWARD MARK SLOCUM, a citizen of the United States, residing at Medan, Province of Deli, Sumatra, Dutch East Indies, have invented certain new and useful Improvements in Processes for Treating Latex and Products Thereof, of which the following is a full, clear, and exact description.

This invention relates to processes and apparatus for treating latex including its preparation for vulcanization and to the products obtained thereby. It is more particularly directed to a process for drying latex under vacuum in either a coagulated or uncoagulated state and preparing it for vulcanization; to an apparatus for carrying out such drying; and to the products obtained thereby.

The drying of latex in open air, unless special precautions are taken, results in slime-formation. This slime is an exudation of nitrogenous and other materials such as sugars, gums, etc., held in solution, suspension, or other form in the latex. The slime interferes with the drying operation itself and also presents a field for the accumulation of mold, larvæ of insects, bacteria, and consequent putrefaction, etc. Vacuum drying has been proposed but I have found upon carrying out vacuum drying under ordinary conditions that the latex foams enormously causing serious interference with the drying operation.

The principal objects of the present invention are accordingly to prevent the formation of slime with or without subsequent drying and to provide a simple and an efficient process under vacuum which shall substantially do away with the foaming mentioned. Another object of the invention is to provide a simple apparatus for carrying out the above process. Another object is to provide a product resulting from such process which shall be slime-free while preserving therewithin the various nitrogenous constituents or reaction products thereof normally present in the latex.

In carrying out the process the mass of rubber-containing latex or similar material is treated with an agent adapted to render the nitrogenous and similar material insoluble whereupon the vacuum evaporation is proceeded with. In such insoluble form it will be observed that the nitrogenous and other materials will not exude upon the surface of the rubber coagulum resulting from the coagulation of the latex and consequently slime-formation will be substantially prevented.

In its preferred specific form the process consists in placing a quantity of uncoagulated hevea latex in a vacuum chamber and before actual ebullition commences raising the temperature of the latex to at least 80-85° C. It has been found that the nitrogenous and similar material in hevea latex coagulates substantially entirely at this temperature. The chamber being evacuated, drying of the latex under vacuum is continued until the resulting mass contains a desired content of moisture. It has been found that rubber with 18 to 20% moisture-content will not "weep" that is, permit a collection of moisture on the surface thereof and yet contains sufficient moisture when shipped to prevent oxidation *en route*. Evaporation to such moisture-content therefore constitutes a convenient limit for the operation of the process. Such evaporation requires a comparatively low vacuum and may be conducted with rapidity. The rapidity may be increased if desired by causing the circulation over the latex of a drying medium such as heated deoxygenated air. Such treatment will be described hereinafter more fully in connection with the preferred form of apparatus used for drying. Either prior or subsequent to the insolubilization or coagulation of the rubber, sulfur or other vulcanizing agent may be incorporated with the mass, or such incorporation may take place at any time prior to vulcanization.

The following are some of the alternative methods which may be carried out in place of the preferred process and have been found to produce satisfactory results.

(*a*) Prior to its introduction into the vacuum drier, the uncoagulated latex may be heated in an external vessel until insolubilization of proteins and similar substances has taken place.

(*b*) The latex may be first coagulated and this coagulum heated to 80-85° C. until the proteins and similar substances have been rendered insoluble. This may be done prior to the entry of the coagulum into the vacuum drier or in the vacuum chamber itself before actual drying takes place.

(*c*) The latex after being suitably heated to 80–85° C. may be coagulated and this coagulum dried in vacuum.

(d) The uncoagulated latex may be treated with suitable enzyms or suitable coagulating ferments such as rennet which will insolubilize its protein-content, and the latex so treated, or its coagulum dried under any convenient vacuum.

(e) The uncoagulated latex may be treated with chemicals which precipitate the proteins, and this latex or its coagulum subjected to evaporation in vacuum.

(f) Antiseptics may be added to the coagulated or uncoagulated latex either before or after the insolubilization of the protein-content by any of the methods mentioned above, and the evaporation of the latex may be proceeded with before or after the coagulation takes place.

As a preferred specific example of the use of antiseptic material 0.2% beta-naphthol is added to the uncoagulated latex before its introduction into the vacuum chamber. The preferred specific process of protein-insolubilization and vacuum-evaporation mentioned above is then carried on. It will be noted that beta-naphthol as pointed out in one of my co-pending applications is adapted to render the nitrogenous matter insoluble, being one of a large class of materials adapted for this purpose. It thus not only stabilizes but also aids in the insolubilization of the nitrogenous material. It will be observed that various other antiseptics may be used as sodium naphtholate, for example, or the latex may be treated with 0.5% of pine tar creosote in sodium cresylate solution, or with 0.1% of sodium fluorid, or with the various antiseptics mentioned in my other co-pending applications.

In carrying out the process above in its preferred form a convenient form of apparatus which may be employed is shown in the accompanying drawings, in which—

Figure 1 represents an end elevation of a vacuum chamber with the door removed; and Fig. 2 represents a longitudinal sectional elevation thereof.

Referring now more particularly to these drawings the numeral 1 indicates a vacuum chamber provided with a valved-inlet pipe 2 in the top thereof and a vacuum-exhaust pipe 3 leading from a side wall preferably just below the top. The pipe 3 connects with an ordinary type of vacuum pump 4. A series of superposed latex pans 5 is arranged in the chamber 1, with their walls fitting tightly against the side walls of the chamber. These latex pans are suitably supported by brackets 6 and are alternately reversed and staggered with respect to one another, that is, the lip 7 of each pan overhangs the opposite end of the pan immediately therebelow. The side walls 8 of the pan decrease in height from the end wall 9 of the pan toward the lip. Where they join the end wall they are substantially equal in height thereto. When the level of the latex is equal to the height of the lip the side and end walls will project above the surface thereof. Thus when the pan overflows it will overflow only at the lip.

Preferably beneath each pan is a set of steam coils 10 forming a part of a continuous system passing from below one pan to the bottoms of successive pans. The extremities of the coils are connected to an outside source of steam adapted to dry latex held in the pans.

At the end of the drying chamber opposite that through which the pans are inserted is a fuel chamber 11 which communicates with the vacuum chamber through suitable orifices 12 adjacent the bottom of the vacuum chamber. The chamber 11 is provided with a grate 13 on which may be burned charcoal or other fuel. The air supply may be controlled by means of a damper 14 controlling a passage 15 above the grate.

In the operation of the apparatus for carrying out the process described the latex pans are placed on the brackets for their support, the lip of the top pan being remote from the door 16 through which the pan is inserted and its rear-wall 9 abutting the end-wall opposite the door. The next succeeding pan has its rear-wall 9 abutting the door and its lip 7 remote from the opposite end-wall. The latex is admitted through the valved-pipe 2 on to the top pan of the series, which fills. The excess latex overflows at the lip 7 and is received by the projecting portion of the pan immediately therebelow. This pan fills and overflows at its lip 7 into the pan immediately therebelow and so on to the bottom pan of the rack. When this pan is filled the flow of latex is cut off. After heating to 80–85° C. as heretofore set forth for insolubilization of the protein and other substances, the vacuum evaporation is carried out.

The drying produced by steam pipes 10 is preferably supplemented by the admission of a current of a drying medium to the vacuum chamber. Provision for such drying medium is made in the present embodiment through heated air which is deoxygenated by passing through burning charcoal in the grate 13. The amount of air admitted may be controlled by the damper 14, and thus the amount of vacuum in the chamber 1 may be controlled. In view of the tight fit between the sides of the latex pans and those of the chamber 1, the deoxygenated air is forced to take a zig-zag course through the chamber, in a manner indicated by the arrows, to the vacuum-outlet pipe 3.

When drying to the desired moisture-content is accomplished the treated material may be removed from the drier and pressed into blocks or bales for shipment.

It will thus be seen that, among others, the objects heretofore enumerated are achieved by the embodiment of the invention set forth. The process has been found to successfully overcome the foaming of the latex. The apparatus is simple and in view of the low vacuum which may be maintained in the drying is economical. The products obtained are substantially free from tendency to slime-formation and represent a dense, tough, very finely and closely grained rubber.

As many apparently widely different embodiments of this invention could be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating coagulated or uncoagulated latex which comprises rendering the nitrogenous matter contained in a mass of latex containing nitrogenous matter and moisture, insoluble, subjecting the said so-treated mass to vacuum evaporation and adding a vulcanizing agent thereto.

2. A process for treating coagulated or uncoagulated latex which comprises heating the mass of latex containing nitrogenous material and moisture to a temperature sufficient to coagulate said nitrogenous material, maintaining said temperature to produce coagulation, subjecting the mass to a vacuum evaporation and adding a vulcanizing agent thereto.

3. A process for treating coagulated or uncoagulated latex which comprises heating a mass of hevea latex containing nitrogenous material and moisture to approximately 80° C. maintaining said temperature to produce coagulation, subjecting the mass to a vacuum evaporation and adding a vulcanizing agent thereto.

4. A process for treating coagulated or uncoagulated latex which comprises rendering the nitrogenous matter contained in a mass of latex containing nitrogenous matter and moisture, insoluble, adding an antiseptic thereto, removing moisture therefrom and adding a vulcanizing agent thereto.

5. A process for treating coagulated or uncoagulated latex which comprises rendering the nitrogenous matter contained in a mass of latex containing nitrogenous matter and moisture, insoluble, adding an antiseptic agent thereto, removing moisture from said mass and adding a vulcanizing agent thereto.

6. A process for treating coagulated or uncoagulated latex which comprises heating the mass of latex comprising rubber, nitrogenous matter and moisture with beta-naphthol to a temperature of approximately 80° C. subjecting the mass to vacuum evaporation, coagulating the mass and adding a vulcanizing agent thereto.

7. As a new compound, a rubber mass produced by vacuum evaporation containing insolubilized nitrogenous material.

8. As a new compound, a rubber mass produced by vacuum evaporation containing an insoluble nitrogenous material insolubilized by heat.

9. As a new compound, a rubber mass produced by vacuum evaporation containing insoluble nitrogenous material insolubilized by heat, and a stabilizing material.

10. A process for treating coagulated or uncoagulated latex which comprises admitting latex containing nitrogenous material and moisture to a chamber, heating the latex to insolubilize the nitrogenous material therein, evacuating the chamber, passing a current of a drying medium over the latex to remove the moisture therefrom, and adding a vulcanizing agent thereto.

11. A process for treating coagulated or uncoagulated latex which comprises admitting latex containing nitrogenous material and moisture to a chamber, heating the latex to approximately 80° C., to insolubilize the nitrogenous material, evacuating the chamber and passing a current of a drying medium over the latex to remove the moisture therefrom and adding a vulcanizing agent thereto.

12. A process for treating coagulated or uncoagulated latex which comprises admitting latex to a chamber comprising a plurality of superposed receptacles adapted to overflow from one into another, filling said receptacles, rendering the nitrogenous matter in said latex insoluble and adding a vulcanizing agent thereto.

13. A process for treating coagulated or uncoagulated latex which comprises rendering the nitrogenous matter contained in a mass of latex containing nitrogenous matter and moisture, insoluble, and subjecting the said so-treated mass to vacuum evaporation.

14. A process for treating coagulated or uncoagulated latex which comprises heating the mass of latex containing nitrogenous material and moisture to a temperature sufficient to coagulate said nitrogenous material, maintaining said temperature to produce coagulation and subjecting the mass to a vacuum evaporation.

15. A process for treating coagulated or uncoagulated latex which comprises heating a mass of hevea latex containing nitrogenous material and moisture to approximately 80° C. maintaining said temperature to produce coagulation, and subjecting the mass to a vacuum evaporation.

16. A process for treating coagulated or uncoagulated latex which comprises rendering the nitrogenous matter contained in a mass of latex containing nitrogenous matter and moisture, insoluble, adding an antiseptic thereto and removing moisture therefrom.

17. A process for treating coagulated or uncoagulated latex which comprises rendering the nitrogenous matter contained in a mass of latex containing nitrogenous matter and moisture, insoluble, adding an antiseptic agent thereto and removing moisture from said mass.

18. A process for treating coagulated or uncoagulated latex which comprises heating the mass of latex comprising rubber, nitrogenous matter and moisture with beta-naphthol to a temperature of approximately 80° C. subjecting the mass to vacuum evaporation and coagulating the mass.

19. A process of the kind described which comprises heating a mass containing rubber protein to approximately 80° C. and insolubilizing the protein.

20. A process for treating coagulated or uncoagulated latex which comprises admitting latex containing nitrogenous material and moisture to a chamber, heating the latex to insolubilize the nitrogenous material therein, evacuating the chamber, and passing a current of a drying medium over the latex to remove the moisture therefrom.

21. A process for treating coagulated or uncoagulated latex which comprises admitting latex containing nitrogenous material and moisture to a chamber, heating the latex to approximately 80° C., to insolubilize the nitrogenous material, evacuating the chamber and passing a current of a drying medium over the latex to remove the moisture therefrom.

22. A process for treating coagulated or uncoagulated latex which comprises admitting latex to a chamber comprising a plurality of superposed receptacles adapted to overflow from one into another, filling said receptacles and rendering the nitrogenous matter in said latex insoluble.

Signed at New York, county and State of New York, this 5 day of January, 1917.

EDWARD MARK SLOCUM.

Copies of this patent may be obtained for five cents each, by addressing the "Commissioner of Patents, Washington, D. C."